US006990864B2

(12) United States Patent
Sakai (10) Patent No.: US 6,990,864 B2
(45) Date of Patent: Jan. 31, 2006

(54) SEMICONDUCTOR DYNAMIC QUANTITY SENSOR

(75) Inventor: Minekazu Sakai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/298,604

(22) Filed: Nov. 19, 2002

(65) Prior Publication Data

US 2003/0101817 A1 Jun. 5, 2003

(30) Foreign Application Priority Data

Dec. 3, 2001 (JP) .............................. 2001-369030

(51) Int. Cl.
*G01P 15/125* (2006.01)
*G01P 9/04* (2006.01)
(52) U.S. Cl. ............................... 73/514.32; 73/504.04; 73/504.12
(58) Field of Classification Search ............. 73/514.18, 73/514.32, 514.02, 510, 504.02, 504.04, 73/504.12, 504.14, 514.29
See application file for complete search history.

(56) References Cited

U.S. PATENT DOCUMENTS

| | | | | |
|---|---|---|---|---|
| 5,734,105 A | * | 3/1998 | Mizukoshi | ................ 73/504.02 |
| 5,812,427 A | * | 9/1998 | Nonoyama et al. | .......... 702/141 |
| 5,880,369 A | | 3/1999 | Samuels et al. | |
| 5,894,091 A | * | 4/1999 | Kubota | ..................... 73/504.12 |
| 5,969,225 A | | 10/1999 | Kobayashi | |
| 6,450,031 B1 | * | 9/2002 | Sakai et al. | ............... 73/514.16 |
| 6,467,349 B1 | * | 10/2002 | Andersson et al. | ....... 73/504.14 |
| 6,502,462 B2 | * | 1/2003 | Sakai | ....................... 73/514.32 |
| 6,591,678 B2 | * | 7/2003 | Sakai | ....................... 73/514.36 |
| 6,672,161 B2 | * | 1/2004 | Sakai et al. | .............. 73/514.32 |

FOREIGN PATENT DOCUMENTS

| | | |
|---|---|---|
| EP | 0 547 742 A1 | 6/1993 |
| JP | A-H09-113534 | 5/1997 |
| JP | 11-201850 * | 7/1999 |
| JP | 2001-004658 | 1/2001 |
| JP | 2002-71708 * | 3/2002 |

OTHER PUBLICATIONS

Chinese Office Action dated Aug. 12, 2005 with its English translation.

* cited by examiner

*Primary Examiner*—Helen Kwok
(74) *Attorney, Agent, or Firm*—Posz Law Group, PLC

(57) ABSTRACT

A semiconductor dynamic quantity sensor includes a semiconductor substrate that includes a movable electrode, a pair of first fixed electrodes, and a pair of second fixed electrodes. The first and second pairs of first detection capacitances and the first and second pairs of second detection capacitances are formed by the electrodes. The dynamic quantity related to the force applied to the sensor is measured on the basis of the sum of the differential output between the first pair of the first detection capacitances, the differential output between the second pair of the first detection capacitances, the differential output between the first pair of the second detection capacitances, and the differential output between the second pair of the second detection capacitances, when the movable electrode moves along the first direction or the second direction under the force. The sum includes a relatively small amount of noises.

9 Claims, 7 Drawing Sheets

SEMICONDUCTOR DYNAMIC QUANTITY SENSOR

CROSS REFERENCE TO RELATED APPLICATION

This application is based on and incorporates herein by reference Japanese Patent Application No. 2001-369030 filed on Dec. 3, 2001.

BACKGROUND OF THE INVENTION

The present invention relates to a semiconductor dynamic quantity sensor such as an acceleration sensor, which includes a movable electrode that can move along two axes and a fixed electrode that partially faces the movable electrode across a gap for detection. The dynamic quantity related to a force applied to the sensor along the two axes is detected on the basis of the changes in capacitance between the electrodes.

Figure 8:
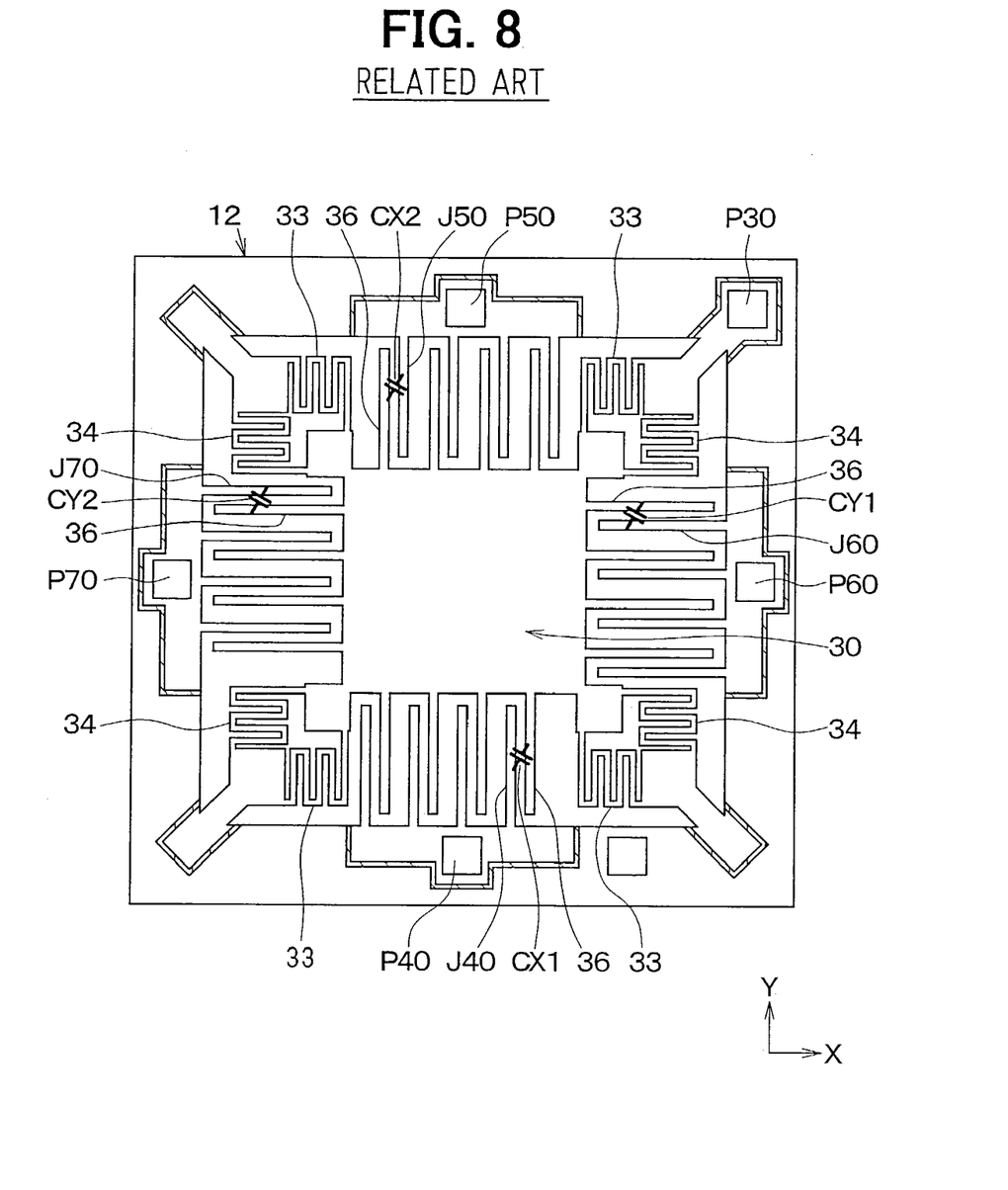
FIG. 8 is a schematic plan view of a proposed semiconductor acceleration sensor capable of detecting accelerations along two axes.

An acceleration sensor disclosed in JP-A-5-249138 is an example of the semiconductor dynamic quantity sensors, or two-axis sensors, capable of detecting acceleration along two orthogonal axes. A semiconductor sensor in FIG. 8 is proposed by the inventor as an acceleration sensor of that kind. The sensor in FIG. 8 can be manufactured using a well-known semiconductor manufacturing process. In the manufacturing process, grooves are formed in a semiconductor substrate 12 to form a movable electrode 30 and fixed electrodes J40, J50, J60, J70.

In the semiconductor sensor in FIG. 8, the movable electrode 30 can move along a first direction X and a second direction Y, which are orthogonal to each other on a surface parallel to the semiconductor substrate 12, in response to the acceleration of the sensor. As shown in FIG. 8, the movable electrode 30 is movably supported by beams 33, 34, so movable electrode 30 moves along the first direction X with the spring-like action of the beam 33 when there is acceleration along the first direction X, and along the second direction Y with the spring-like action of the beam 34 when there is acceleration along the second direction Y, which is orthogonal to the first direction X.

As shown in FIG. 8, movable electrode portions 36, which are shaped like a comb with teeth and include a plurality of movable electrode teeth, are located at two ends of the movable electrode 30 along the first direction X and at two ends of the movable electrode 30 along the second direction Y. Each of the fixed electrodes J40, J50, J60, J70 is shaped like a comb with teeth and includes a plurality of fixed electrode teeth. Each of the fixed electrodes J40, J50, J60, J70 is supported and fixed in the semiconductor substrate 12.

Each of the fixed electrodes J40, J50, J60, J70 interleave with each movable electrode portion 36 such that each fixed electrode tooth of the fixed electrodes J40, J50, J60, J70 faces each movable electrode tooth of each movable electrode portion 36 at the two ends along the first direction X and at the two ends along the second direction Y of the movable electrode 30, respectively. The fixed electrodes J40, J50, which interleave with the movable electrode portions 36 at the two ends of the movable electrode 30 along the second direction Y, are a pair of first fixed electrodes J40, J50.

Two first detection capacitances CX1, CX2 are formed with the first fixed electrodes J40, J50 and the movable electrode portions 36. As shown in FIG. 8, one of the first detection capacitance CX1 is formed between the fixed electrode J40 and one of the movable electrode portions 36, and the other of the first detection capacitance CX2 is formed between the fixed electrode J50 and another one of the movable electrode portions 36.

The fixed electrodes J60, J70, which interleave with the movable electrode portions 36 at the two ends of the movable electrode 30 along the first direction X, are a pair of second fixed electrodes J60, J70. Two second detection capacitances CY1, CY2 are formed with the second fixed electrodes J60, J70 and the movable electrode portions 36. As shown in FIG. 8, one of the second detection capacitance CY1 is formed between the fixed electrode J60 and one of the movable electrode portions 36, and the other of the second detection capacitance CY2 is formed between the fixed electrode J70 and another one of the movable electrode portions 36. In FIG. 8, each capacitance CX1, CX2, CY1, and CY2 is represented by a capacitor symbol.

As shown in FIG. 8, pads P30, P40, P50, P60, P70, which are made of aluminum and so on and respectively correspond to the movable electrode 30 and the fixed electrodes J40, J50, J60, J70, are located on the semiconductor substrate 12. Each electrode 30, J40, J50, J60, J70 is electrically connected to each corresponding pad P30, P40, P50, P60, P70. Although not illustrated, each pad P30, P40, P50, P60, P70 is electrically connected to an outside circuit or a wiring line by, for example, wire bonding.

When the movable electrode 30 moves along the first direction X under acceleration in the two axes sensor of FIG. 8, the acceleration is detected on the basis of changes in the first detection capacitances CX1, CX2. When the movable electrode 30 moves along the second direction Y under acceleration, the acceleration is detected on the basis of changes in the second detection capacitances CY1, CY2.

Figure 9:
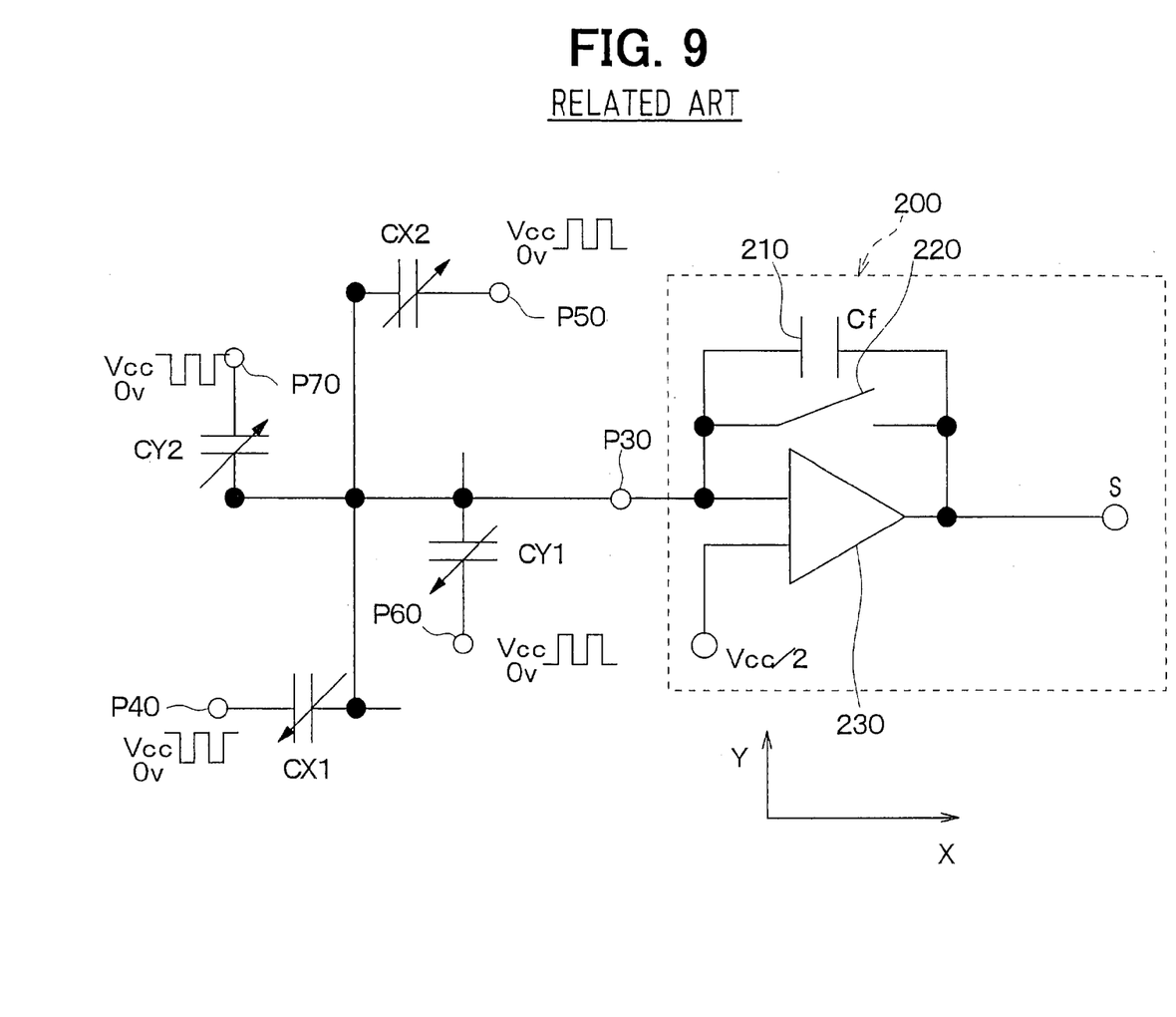
FIG. 9 is an equivalent circuit diagram for the sensor shown in FIG. 8.

Specifically, as shown in FIG. 9, the change in detection capacitances CX1, CX2, CY1, CY2 is detected using a switched capacitor circuit 200 in an external circuit, to which the semiconductor sensor in FIG. 8 is electrically connected. The switched capacitor circuit 200 is a C-V converter circuit and includes a capacitor 210, which has a capacitance Cf, a switch 220, and a differential amplifier circuit 230 for converting an inputted capacitance into a voltage as the output of the switched capacitor circuit 200.

As shown in FIG. 9, a pair of carrier waves Vcc are sent to the first fixed electrodes J40, J50 such that the electrodes J40, J50 have a phase opposite to each other. At the same time, another pair of carrier waves Vcc are sent to the second fixed electrodes J60, J70 such that the electrodes J60, J70 have a phase opposite to each other. The pairs of carrier waves Vcc are sent from the external circuit through each of the pads P30, P40, P50, P60, P70. In the mean time, the switch 220 in the switched capacitor circuit 200 is turned on and off with a predetermined timing.

In that case, the acceleration is detected as an output S' shown in eq. 1.

$$S'=[(CY2-CY1)+(CX2-CX1)] \times Vcc/Cf \qquad \text{(eq. 1)}$$

That is, in the proposed two-axis sensor in FIG. 8, the acceleration is detected on the basis of the sum of the differential output (CX2−CX1) from the first detection capacitances CX1, CX2 and the differential output (CY2−CY1) from the second direction capacitance CY1, CY2, when the movable electrode 30 moves along the first direction X or the second direction Y under the acceleration.

Specifically, in the proposed two-axis sensor in FIG. 8, when the movable electrode 30 moves along the first direction X toward, for example, the right hand side in FIG. 8, the distance between each fixed electrode tooth of one of the first fixed electrodes J40 and each movable electrode tooth of corresponding movable electrode portion 36 becomes wider, while the distance between each fixed electrode tooth of the other first fixed electrode J50 and each movable electrode tooth of corresponding movable electrode portion 36 becomes narrower. As a result, the acceleration along the first direction X is detected on the basis of the differential output (CX2−CX1) from the first detection capacitances CX1, CX2.

On the other hand, when the movable electrode 30 moves, for example, upward in FIG. 8 along the second direction Y, the distance between each fixed electrode tooth of one of the second fixed electrodes J60 and each movable electrode tooth of corresponding movable electrode portion 36 becomes wider, while the distance between each fixed electrode tooth of the other second fixed electrode J70 and each movable electrode tooth of corresponding movable electrode portion 36 becomes narrower. As a result, the acceleration along the second direction Y is detected on the basis of the differential output (CY2−CY1) from the second direction capacitances CY1, CY2.

However, when the movable electrode 30 moves along the first direction X, not only the first detection capacitances CX1, CX2 change, but also the second detection capacitances CY1, CY2 slightly change because the sizes of the overlapping areas, in which each fixed electrode tooth of the second fixed electrode J60, J70 and each movable electrode tooth of corresponding movable electrode portion 36 face each other, also changes.

When the movable electrode 30 moves along the first direction X toward, for example, the right hand side in FIG. 8, the overlapping area between each fixed electrode tooth of one of the second fixed electrodes J60 and each movable electrode tooth of corresponding movable electrode portion 36 becomes larger, while the overlapping area between each fixed electrode tooth of the other second fixed electrode J70 and each movable electrode tooth of corresponding movable electrode portion 36 becomes smaller. In other words, in addition to the expected output for the acceleration detection in the first direction X, which is the differential output (CX2−CX1) from the first detection capacitance CX1, CX2, a change in the differential output (CY2−CY1) from the second detection capacitances CY1, CY2, which are used to detect the acceleration detection in the second direction Y, is also picked up as noises.

When the movable electrode 30 moves, for example, upward in FIG. 8 along the second direction Y, the overlapping area between each fixed electrode tooth of one of the first fixed electrodes J40 and each movable electrode tooth of corresponding movable electrode portion 36 becomes smaller, while the overlapping area between each fixed electrode tooth of the other first fixed electrode J50 and each movable electrode tooth of corresponding movable electrode portion 36 becomes larger. In other words, in addition to the expected output for the acceleration detection in the second direction Y, which is the differential output (CY2−CY1) from the second detection capacitance CY1, CY2, a change in the differential output (CX2−CX1) from the first detection capacitances CX1, CX2, which are used to detect the acceleration detection in the first direction X, is also picked up as noises.

The above phenomena will be described using mathematical equations. Provided that each of the first and second detection capacitances CX1, CX2, CY1, CY2 is initially C0, the changes in the first detection capacitances CX1, CX2 is respectively $\Delta Cx$, and the changes in the second detection capacitances CY1, CY2 is respectively $\Delta Cy$. When the proposed sensor in FIG. 8 is not under acceleration, $$CX1 = CX2 = CY1 = CY2 = C0.$$

When the movable electrode 30 moves along the first direction X toward the right hand side in FIG. 8, one of the first detection capacitances CX1 decreases because the distance between each fixed electrode tooth of one of the first fixed electrodes J40 and each movable electrode tooth of corresponding movable electrode portion 36 becomes wider, while the other first detection capacitance CX2 increases because the distance between each fixed electrode tooth of the other first fixed electrode J50 and each movable electrode tooth of corresponding movable electrode portion 36 becomes narrower.

At the same time, one of the second detection capacitances CY1 increases because the overlapping area between each fixed electrode tooth of one of the second fixed electrodes J60 and each movable electrode tooth of corresponding movable electrode portion 36 becomes larger, while the other second detection capacitance CY2 decreases because the overlapping area between each fixed electrode tooth of the other second fixed electrode J70 and each movable electrode tooth of corresponding movable electrode portion 36 becomes smaller. In that case, the output S' is expressed in eq. 2:

$$\begin{aligned} S' &= \{(CY2 - CY1) + (CX2 - CX1)\} \times \\ & \quad Vcc/Cf = [\{(C0 - \Delta Cy) - (C0 + \Delta Cy)\} + \\ & \quad \{(C0 + \Delta Cx) - (C0 - \Delta Cx)\}] \times Vcc/Cf = \\ & \quad \{(C0 - \Delta Cy - C0 - \Delta Cy) + (C0 + \Delta Cx - C0 + \Delta Cx)\} \times \\ & \quad Vcc/Cf = 2 \times (\Delta Cx - \Delta Cy) \times Vcc/Cf \end{aligned} \quad (\text{eq. 2})$$

As shown in eq. 2, when detecting acceleration along the first direction X, in addition to the expected output $2\Delta Cx$, the differential output $-2\Delta Cy$ from the second detection capacitances CY1, CY2, which are used to detect the acceleration detection in the second direction Y, is also picked up as noises.

When the movable electrode 30 moves along the second direction Y upward in FIG. 8, one of the second detection capacitances CY1 decreases because the distance between each fixed electrode tooth of one of the second fixed electrodes J60 and each movable electrode tooth of corresponding movable electrode portion 36 becomes wider, while the other second detection capacitance CY2 increases because the distance between each fixed electrode tooth of the other second fixed electrode J70 and each movable electrode tooth of corresponding movable electrode portion 36 becomes narrower. At the same time, one of the first detection capacitances CX1 decreases because the overlapping area between each fixed electrode tooth of one of the first fixed electrodes J40 and each movable electrode tooth of corresponding movable electrode portion 36 becomes smaller, while the other first detection capacitance CX2 increases because the overlapping area between each fixed electrode tooth of the other first fixed electrode J50 and each movable electrode tooth of corresponding movable electrode portion 36 becomes larger. In that case, the output S' is expressed in eq. 3:

$$S' = \{(CY2 - CY1) + (CX2 - CX1)\} \times \qquad \text{(eq. 3)}$$
$$Vcc/Cf = [\{(C0 + \Delta Cy) - (C0 - \Delta Cy)\} +$$
$$\{(C0 + \Delta Cx) - (C0 - \Delta Cx)\}] \times Vcc/Cf =$$
$$\{(C0 + \Delta Cy - C0 + \Delta Cy) + (C0 + \Delta Cx - C0 + \Delta Cx)\} \times$$
$$Vcc/Cf = 2 \times (\Delta Cx + \Delta Cy) \times Vcc/Cf$$

As shown in eq. 3, when detecting acceleration along the second direction Y, in addition to the expected output 2ΔCy, the differential output 2ΔCx from the first detection capacitances CX1, CX2, which are used to detect the acceleration detection in the first direction X, is also picked up as noises.

Therefore, in the proposed sensor in FIG. 8, whether the sensor is under acceleration along the first direction X or the second direction Y, capacitance changes that are not used for detecting the acceleration are included as noises in the output of the sensor.

SUMMARY OF THE INVENTION

The present invention has been made in view of the above aspects with an object to compensate a capacitance change, which is not related to the capacitance change for measuring a dynamic quantity and is included as a noise in the output of a semiconductor dynamic quantity sensor, which includes a movable electrode, which can move along two axes, and a fixed electrode, which partially faces the movable electrode with a gap to measure the dynamic quantity along the two axes by detecting changes in capacitance between the electrodes.

To compensate the capacitance change, a semiconductor dynamic quantity sensor in the present invention includes a semiconductor substrate that includes a movable electrode, which can move in the sensor along a first direction and a second direction that are orthogonal to each other on a plain parallel to the semiconductor substrate, in response to the force that is applied to the sensor.

The semiconductor substrate also includes a pair of first fixed electrodes, which partially face the movable electrode at two ends of the movable electrode along the second direction to make up first and second pairs of first detection capacitances with the movable electrode. The semiconductor substrate also includes a pair of second fixed electrodes, which partially face the movable electrode at two ends of the movable electrode along the first direction to make up first and second pairs of second detection capacitances with the movable electrode.

In the first pair of the first detection capacitances formed at one end of the movable electrode along the second direction, one capacitance increases while the other capacitance decreases when the movable electrode moves along the first direction. However, the first pair of the first detection capacitances increase or decrease together when the movable electrode moves along the second direction.

In the second pair of the first detection capacitances formed at the other end of the movable electrode along the second direction, one capacitance increases while the other capacitance decreases when the movable electrode moves along the first direction. However, the second pair of the first detection capacitances increase or decrease together when the movable electrode moves along the second direction.

In the first pair of the second detection capacitances formed at one end of the movable electrode along the first direction, one capacitance increases while the other capacitance decreases when the movable electrode moves along the second direction. However, the first pair of the second detection capacitances increase or decrease together when the movable electrode moves along the first direction.

In the second pair of the second detection capacitances formed at the other end of the movable electrode along the first direction, one capacitance increases while the other capacitance decreases when the movable electrode moves along the second direction. However, the second pair of the second detection capacitances increase or decrease together when the movable electrode moves along the first direction.

The dynamic quantity related to a force applied to the sensor is measured on the basis of the sum of the differential output between the first pair of the first detection capacitances, the differential output between the second pair of the first detection capacitances, the differential output between the first pair of the second detection capacitances, and the differential output between the second pair of the second detection capacitances, when the movable electrode moves along the first direction or the second direction under the force.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in detail with reference to various embodiments.

First Embodiment

Figure 1:
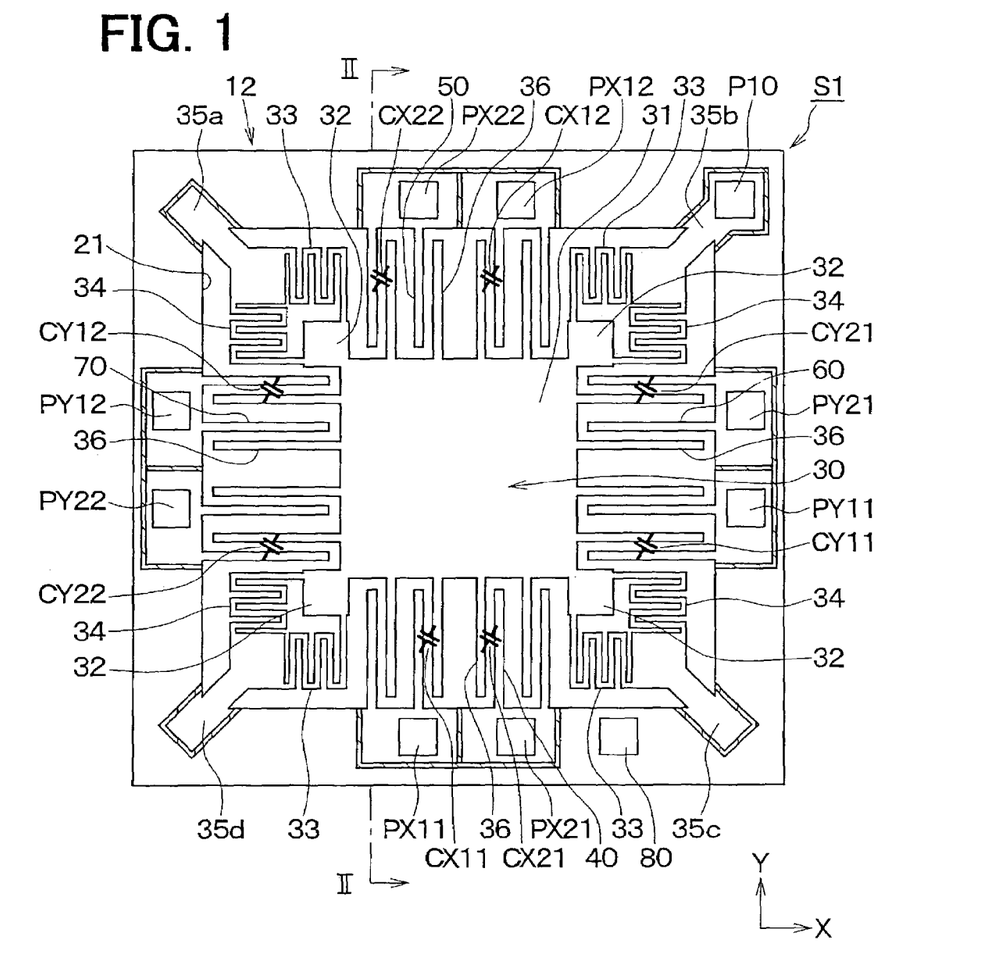
FIG. 1 is a plan view of a semiconductor acceleration sensor according to the first embodiment of the present invention.
Figure 2:
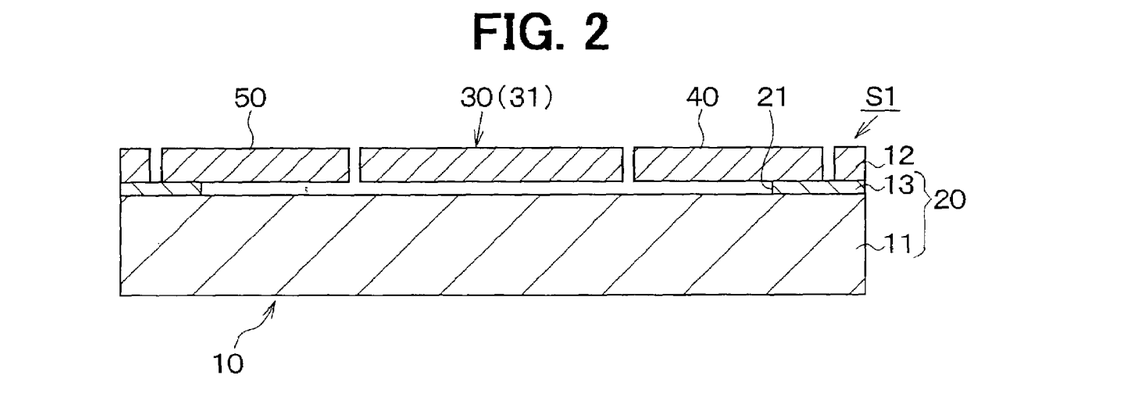
FIG. 2 is a cross-sectional view of the semiconductor acceleration sensor taken along the line II—II in FIG. 1.

As shown in FIGS. 1 and 2, an acceleration sensor S1 of the first embodiment is a differential capacitive semiconductor acceleration sensor, which is a semiconductor dynamic quantity sensor that is capable of measuring a dynamic quantity along two axes.

The semiconductor sensor S1 is formed by machining a semiconductor substrate using a known micro-machining process. The sensor S1, as shown in FIGS. 1 and 2, is formed using a rectangular shaped silicon-on-insulator (SOI) substrate 10, which includes a first silicon substrate 11 as a first semiconductor substrate, a second silicon substrate 12 as a second semiconductor substrate, and a rectangular-frame-like oxide film 13 as an insulating layer. The oxide film 13 is located between the first and second silicon substrates 11, 12.

The second silicon substrate 12 includes electrodes 30, 40, 50, 60, 70 making up capacitors, each capacitance of which is variable. The first silicon substrate 11 and the oxide film 13 make up a support substrate 20, which supports the second silicon substrate 12. The oxide film 13 has a rectangular opening 21 at its central area. The opening 21 is located under the electrodes 30, 40, 50, 60, 70. The second silicon substrate 12 is located to cover the opening 21. The second silicon substrate 12 includes a movable electrode 30, as a movable part, and fixed electrodes 40, 50, 60, 70, which are electrically isolated from the movable electrode 30 by grooves formed in the second silicon substrate 12.

As shown in FIGS. 1 and 2, the second silicon substrate 12 is fixed to and supported by the oxide film 13 at the substantially rectangular-frame-like periphery of the second silicon substrate 12. The fixed electrodes 40, 50, 60, 70, which are included in the periphery, are fixed to and supported by the oxide film 13 at one end of each fixed electrode 40, 50, 60, 70. The fixed electrodes 40, 50, 60, 70 extend inwardly from their fixed ends in the second silicon substrate 12.

The movable electrode 30 is capable of moving in response to acceleration along the first direction X and the second direction Y, which are orthogonal to each other and represented by arrows X and Y in FIG. 1, on a surface parallel to the second silicon substrate 12. As shown in FIG. 1, the movable electrode 30 is positioned substantially above the central part of the rectangular shaped opening 21 and includes a rectangular first weight part 31 and second weight parts 32 that extend outward from the four corners of the first weight part 31.

The second weight parts 32 are anchored to anchoring parts 35a, 35b, 35c, 35d, respectively, at the four corners of the rectangular opening 21 with first beam parts 33, which can expand and shrink in the first direction X, and second beam parts 34, which can expand and shrink along the second direction Y. The anchoring parts 35a, 35b, 35c, 35d are fixed to and supported by the first silicon substrate 11 at the four corners of the oxide film 13 with the rectangular-frame-like oxide film 13 in-between. As a result, the movable electrode 30 is movably supported by the first silicon substrate 11.

As shown in FIGS. 1 and 2, the anchor parts 35a, 35b, 35c, 35d are insulated from the fixed electrodes 40, 50, 60, 70 with grooves, which are located in the second silicon substrate 12 to reach the oxide film 13. In FIG. 1, the grooves in the second silicon substrate 12 are illustrated as hatched parts. The movable electrode 30 and the beam parts 33, 34, which are supported by the anchoring parts 35a, 35b, 35c, 35d, are located above the opening 21.

As shown in FIG. 1, each beam part 33, 34 is a spring-like multiply-folded beam, so each beam part 33, 34 can expand and shrink with the warping deformation of each stacked portion of the folded beam. With the spring-like action of each beam part 33, 34, the movable electrode 30 can move in the acceleration sensor S1 in two directions X, Y as follows.

The movable electrode 30 moves along the first direction X under an acceleration having a component along the first direction X and returns back to the original position as the acceleration stops. On the other hand, the movable electrode 30 moves along the second direction Y under an acceleration having a component along the second direction Y and returns back to the original position as the acceleration stops.

Due to the structure of the beam parts 33, 34, the movable electrode 30 is prevented from moving simultaneously along both directions X, Y, or, in other words, from moving diagonally. That is, the movable electrode 30 substantially moves along only one direction of the first direction X and the second direction Y in response to the magnitude of the acceleration component along the direction.

As shown in FIG. 1, movable electrode portions 36, each of which is shaped like a comb with teeth and includes four movable electrode teeth, are located at two ends of the movable electrode 30 along the first direction X and at two ends of the movable electrode 30 along the second direction Y. The movable electrode teeth extend outward from the four sides of the first weight part 31.

Each fixed electrode 40, 50, 60, 70 is shaped like a comb with teeth and includes four fixed electrode teeth. Each fixed electrode 40, 50, 60, 70 interleaves with each movable electrode portion 36 such that each fixed electrode tooth of the fixed electrodes 40, 50, 60, 70 faces each movable electrode tooth of the movable electrode portions 36 at the two ends along the first direction X and at the two ends along the second direction Y of the movable electrode 30, respectively.

The fixed electrodes 40, 50, which interleave with the movable electrode portions 36 at the two ends of the movable electrode 30 along the second direction Y, are a pair of first fixed electrodes. First and second pairs of first detection capacitances CX11, CX21, CX12, CX22 are formed with the first fixed electrodes 40, 50 and the movable electrode portions 36. As shown in FIG. 1, the first pair of the first detection capacitance Cx11, CX21 are formed between each fixed electrode tooth of one of the first fixed electrodes 40 and each movable electrode tooth of one of the movable electrode portions 36, and the second pair of the first detection capacitance CX12, CX22 are formed between each fixed electrode tooth of the other first fixed electrode 50 and each movable electrode tooth of another one of the movable electrode portions 36.

The fixed electrodes 60, 70, which interleave with the movable electrode portions 36 at the two ends of the movable electrode 30 along the first direction X, are a pair of second fixed electrodes. First and second pairs of second detection capacitances CY11, CY21, CY12, CY22 are formed with the second fixed electrodes 60, 70 and the movable electrode portions 36. As shown in FIG. 1, the first pair of the second detection capacitance CY11, CY21 are formed between each fixed electrode tooth of one of the second fixed electrode 60 and each movable electrode tooth of another one of the movable electrode portions 36, and the second pair of the second detection capacitance CY12, CY22 are formed between each fixed electrode tooth of the other second fixed electrode 70 and each movable electrode tooth of another one of the movable electrode portions 36. In FIG. 1, each capacitance CX11, CX21, CX12, CX22, CY11, CY21, CY12, CY22 is represented by a capacitor symbol.

The acceleration in the first direction X is detected on the basis of changes in the first detection capacitances CX11, CX21, CX12, CX22, which vary in response to the distance between each fixed electrode tooth of the first fixed electrodes 40, 50 and each movable electrode tooth of corresponding movable electrode portion 36. The distance varies in response to the movement of the movable electrode 30 along the first direction X.

On the other hand, the acceleration in the second direction Y is detected on the basis of changes in the second detection capacitances CY11, CY21, CY12, CY22, which vary in response to the distance between each fixed electrode tooth of the second fixed electrode 60, 70 and each movable electrode tooth of corresponding movable electrode portion 36. The distance varies in response to the movement of the movable electrode 30 along the second direction Y.

The first pair of the first detection capacitances CX11, CX21 in FIG. 1, which are used for detecting the acceleration in the first direction X, increase or decrease together in response to the movement of the movable electrode 30 along the second direction Y. However, in response to the movement of the movable electrode 30 along the first direction X, one of the first pair of the first detection capacitances CX11, CX21 increases while the other decreases.

Similarly, the second pair of the first detection capacitances CX12, CX22 in FIG. 1, which are also used for detecting the acceleration in the first direction X, increase or decrease together in response to the movement of the movable electrode 30 along the second direction Y. However, in response to the movement of the movable electrode 30 along the first direction X, one of the second pair of the first detection capacitances CX12, CX22 increases while the other decreases.

The first pair of the second detection capacitances CY11, CY21 in FIG. 1, which are used for detecting the acceleration in the second direction Y, increase or decrease together in response to the movement of the movable electrode 30 along the first direction X. However, in response to the movement of the movable electrode 30 along the second direction Y, one of the first pair of the second detection capacitances CY11, CY21 increases while the other decreases.

Similarly, the second pair of the second detection capacitances CY12, CY22 in FIG. 1, which are also used for detecting the acceleration in the second direction Y, increase or decrease together in response to the movement of the movable electrode 30 along the first direction X. However, in response to the movement of the movable electrode 30 along the second direction Y, one of the second pair of the second detection capacitances CY12, CY22 increases while the other decreases.

That is, one capacitance increases while the other capacitance decreases in the first pair of the first detection capacitances CX11, CX21, the second pair of the first detection capacitances CX12, CX22, the first pair of the second detection capacitances CY11, CY21, and the second pair of the second detection capacitances CY12 and CY22 in response to the movement of the movable electrode 30 under an acceleration in the target direction.

The above relationship between each pair of capacitances CX11 and CX21, CX12 and CX22, CY11 and CY21, CY12 and CY22 is achieved by configuring each capacitance CX11, CX21, CX12, CX22, CY11, CY21, CY12, CY22 in such a manner as shown in FIG. 1. That is, the configuration of two pairs of movable electrode tooth and fixed electrode tooth that make up a pair of capacitances CX11 and CX21, CX12 and CX22, CY11 and CY21, CY12 and CY22 is symmetrical between the pair of capacitances CX11 and CX21, CX12 and CX22, CY11 and CY21, CY12 and CY22.

As shown in FIG. 1, the movable electrode 30 is electrically connected to pads P10, which is located on the anchor part 35b. One of the first fixed electrodes 40, which is used for making up the first pair of first detection capacitances CX11, CX21, is electrically connected to a pair of pads PX11, PX21. The other first fixed electrode 50, which is used for making up the second pair of first detection capacitances CX12, CX22, is electrically connected to another pair of pads PX12, PX22.

One of the second fixed electrodes 60, which is used for making up the first pair of second detection capacitances CY11, CY21, is electrically connected to another pair of pads PY11, PY21. The other second fixed electrode 70, which is used for making up the second pair of second detection capacitances CY12, CY22, is electrically connected to another pair of pads PY12, PY22. The pads P10, PX11, PX21, PX12, PX22, PY11, PY21, PY12, PY22 are located on the periphery of the second silicon substrate 12.

As shown in FIG. 1, a pad 80, which is electrically isolated from the pads P10, PX11, PX21, PX12, PX22, PY11, PY21, PY12, PY22 for the fixed electrodes 40, 50, 60, 70 and the movable electrode 30, is located on the periphery of the second silicon substrate 12. The pad 80 is used for fixing the potential of the periphery except for the fixed electrodes 40, 50, 60, 70 in the second silicon substrate 12.

Each pad P10, PX11, PX21, PX12, PX22, PY11, PY21, PY12, PY22 is in electric contact with each corresponding electrode while being electrically isolated from each other by air isolation using the grooves that reach down to the oxide film 13 in the second silicon substrate 12, as shown in FIG. 1. Each pad P10, PX11, PX21, PX12, PX22, PY11, PY21, PY12, PY22 is made of, for example, aluminum. Although not illustrated, each pad P10, PX11, PX21, PX12, PX22, PY11, PY21, PY12, PY22 is electrically connected to an outside circuit or a wiring member by, for example, wire bonding.

The semiconductor acceleration sensor S1 can be manufactured, for example, by forming grooves, which are defined by the electrodes 30, 40, 50, 60, 70 and reach down to the oxide film 13, using a trench etching method in the second silicon substrate 12 of the SOI substrate 10, then forming each pad P10, PX11, PX21, PX12, PX22, PY11, PY21, PY12, PY22, and then removing partially the oxide film 13 through the grooves using a sacrificial etching method to form the opening 21.

Figure 3:
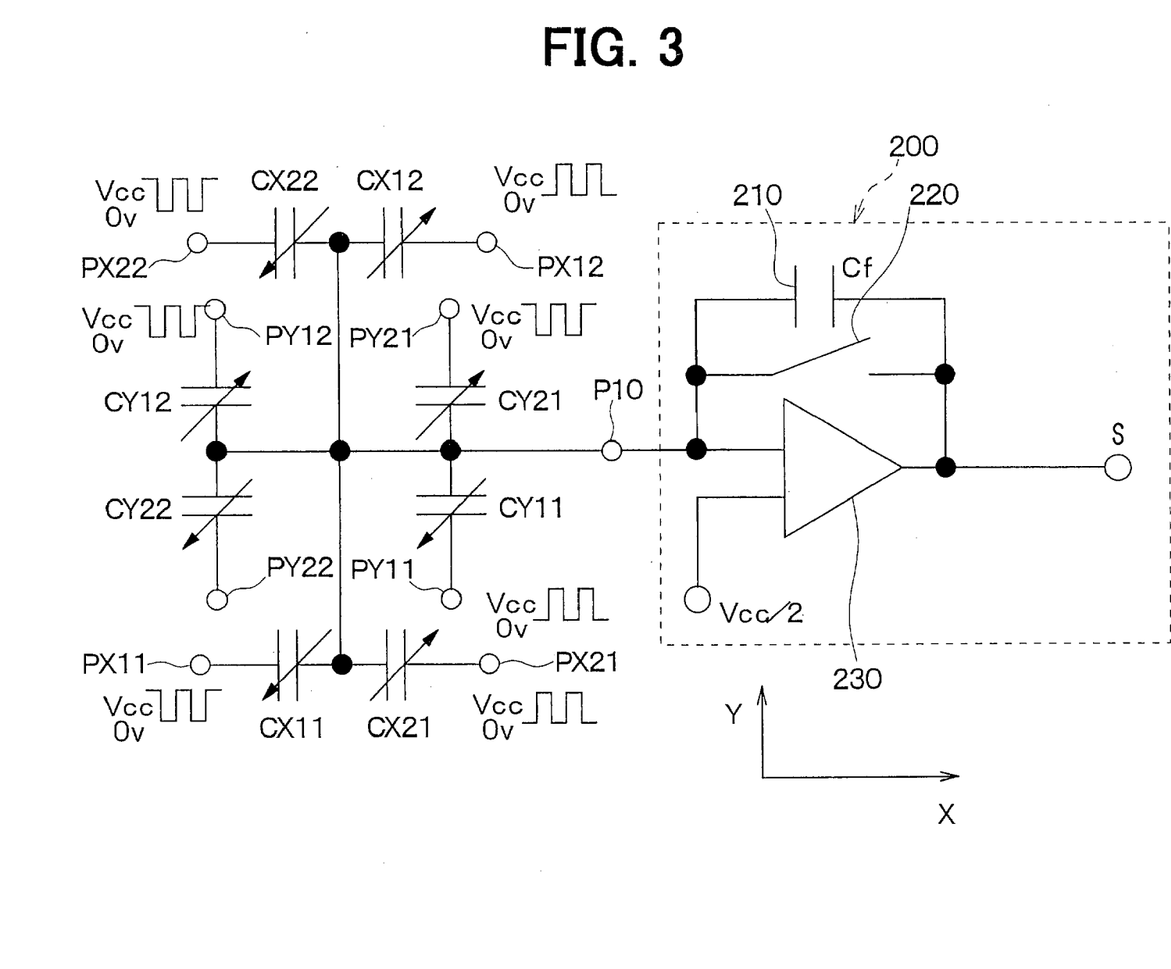
FIG. 3 is an equivalent circuit diagram for the sensor shown in FIG. 1.

The method used for detecting an acceleration in the semiconductor acceleration sensor S1 will be described next. As shown in FIG. 3, changes in the detection capacitances CX11, CX21, CX12, CX22, CY11, CY21, CY12, CY22 are detected by a switched capacitor circuit 200 in the external circuit. The switched capacitor circuit 200 is a C-V converter circuit and includes a capacitor 210 having a capacitance Cf, a switch 220, and a differential amplifier circuit 230 to convert an inputted capacitance into a voltage as the output of the switched capacitor circuit 200.

As shown in FIG. 3, a pair of carrier waves are sent to one of the first fixed electrodes 40 through corresponding pads PX11, PX21 such that corresponding capacitances CX11, CX21 have a phase opposite to each other. At the same time, another pair of carrier waves are sent to the other first fixed electrode 50 through corresponding pads PX12, PX22 such that corresponding capacitances CX12, CX22 have a phase opposite to each other. At the same time, another pair of carrier waves are sent to one of the second fixed electrodes 60 through corresponding pads PY11, PY21 such that corresponding capacitances CY11, CY21 have a phase opposite to each other. At the same time, another pair of carrier waves are sent to the other second fixed electrode 70 through corresponding pads PY12, PY22 such that corresponding capacitances CY12, CY22 have a phase opposite to each other. In the mean time, the switch 220 in the switched capacitor circuit 200 is turned on and off with a predetermined timing.

In that case, the acceleration is detected as an output S shown in eq. 4.

$$S=\{(CX21-CX11)+(CX12-CX22)+(CY21-CY11)+(CY12-CY22)\} \times Vcc/Cf$$

That is, in the acceleration sensor in FIG. 1, the acceleration is detected on the basis of the sum of the differential output (CX21− CX11) from the first pair of the first detection capacitances CX21, CX11, the differential output (CX12−CX22) from the second pair of the first detection capacitances CX12, CX22, the differential output (CY21−CY11) from the first pair of the second detection capacitances CY21, CY11, and the differential output (CY12−CY22) from the second pair of the second detection capacitances CY12, CY22, when the movable electrode 30 moves along the first direction X or the second direction Y in response to an acceleration.

Figure 4:
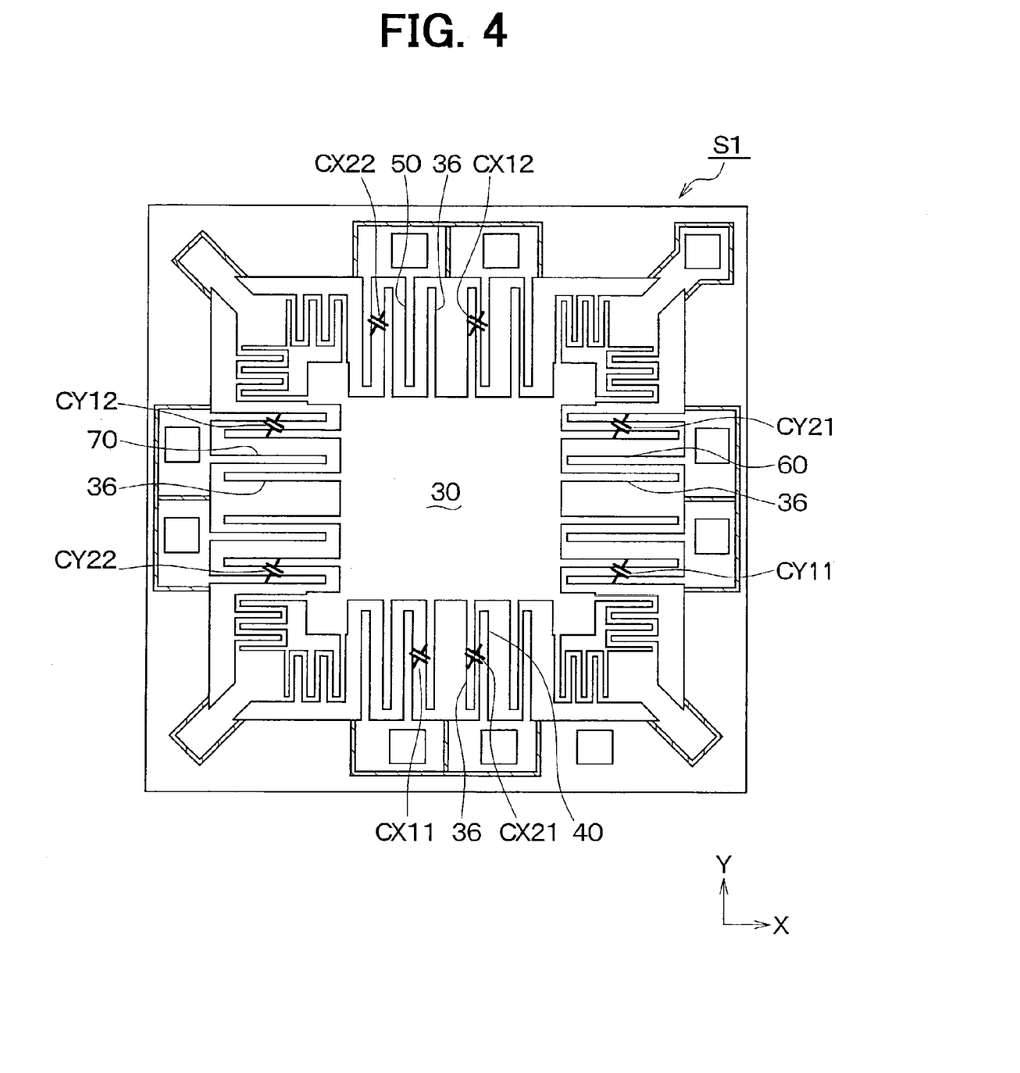
FIG. 4 is a plan view of the sensor shown in FIG. 1 showing a state of the sensor when the movable electrode moves along the first direction X.

As shown in FIG. 4, when the movable electrode 30 moves along the first direction X toward the right hand side in FIG. 1 under an acceleration along the first direction X, two of the first detection capacitances CX11, CX22 decreases because the distance between each movable electrode tooth and each fixed electrode tooth of corresponding electrodes 36 40, 50 becomes wider, while the other two of first detection capacitance CX21, CX12 increases because the distance between each movable electrode tooth and each fixed electrode tooth of corresponding electrodes 36 40, 50 becomes narrower.

On the other hand, the first pair of the second detection capacitances CY11, CY21 increase because the overlapping area between each fixed electrode tooth of one of the second fixed electrodes 60 and each movable electrode tooth of corresponding movable electrode portion 36 becomes larger, while the second pair of the second detection capacitances CY12, CY22 decrease because the overlapping area between each fixed electrode tooth of the other second fixed electrode 70 and each movable electrode tooth of corresponding movable electrode portion 36 becomes smaller.

Provided that each detection capacitance CX11, CX21, CX12, CX22, CY11, CY21, CY12, CY22 is initially C0, the changes in the first detection capacitances CX11, CX21, CX12, CX22 are respectively ΔCx, and changes the second detection capacitances CY11, CY21, CY12, CY22 are respectively ΔCy. In that case, the detection capacitances CX11, CX21, CX12, CX22, CY11, CY21, CY12, CY22 are described by the following equations:

$$CX11=C0-\Delta Cx, \ CX21=C0+\Delta Cx, \ CX12=C0+\Delta Cx,$$
$$CX22=C0-\Delta Cx, \ CY11=C0+\Delta Cy, \ CY21=C0+\Delta Cy,$$
$$CY12=C0-\Delta Cy, \ CY22=C0-\Delta Cy.$$

Substituting the above equations for the detection capacitances CX11, CX21, CX12, CX22, CY11, CY21, CY12, CY22 in eq. 4, the following equation, eq. 5, is obtained.

$$S = \{(CX21-CX11)+(CX12-CX22)+ \quad \text{(eq. 5)}$$
$$(CY21-CY11)+(CY12-CY22)\} \times Vcc/Cf =$$
$$\{(C0+\Delta Cx-C0+\Delta Cx)+(C0+\Delta Cx-C0+\Delta Cx)+$$
$$(C0+\Delta Cy-C0-\Delta Cy)+(C0-\Delta Cy-C0+\Delta Cy)\} \times$$
$$Vcc/Cf = 4 \times \Delta Cx \times Vcc/Cf$$

Therefore, the output S includes only the changes ΔCx of the first detection capacitances CX11, CX21, CX12, CX22, which are expected to contribute the acceleration detection along the first direction X, because the changes ΔCy of the second detection capacitances CY11, CY21, CY12, CY22, which are noises in the output S, are canceled.

The movement of the movable electrode 30 along the first direction X is detected on the basis of the sum of the differential output (CX21−CX11) of the first pair of the first detection capacitances CX21, CX11 and the differential output (CX12−CX22) of the second pair of the first detection capacitances CX12, CX22, while the changes in the second detection capacitances CY11, CY21, CY12, CY22 are canceled out by the sum of the differential output (CY21−CY11) of the first pair of the second detection capacitances CY21, CY11 and the differential output (CY12−CY22) of the second pair of the second detection capacitances CY12, CY22.

Although not illustrated, when the movable electrode 30 moves in the sensor S1 along the second direction Y upward in FIG. 1 under an acceleration along the second direction Y, two of the second detection capacitances CY11, CY22 decreases because the distance between each movable electrode tooth and each fixed electrode tooth of corresponding electrodes 36, 60, 70 becomes wider, while the other two of first detection capacitance CY21, CY12 increases because the distance between each movable electrode tooth and each fixed electrode tooth of corresponding electrodes 36, 60, 70 becomes narrower.

On the other hand, the first pair of the first detection capacitances CX11, CX21 decrease because the overlapping area between each fixed electrode tooth of one of the second fixed electrodes 40 and each movable electrode tooth of corresponding movable electrode portion 36 becomes smaller, while the second pair of the first detection capacitances CX12, CX22 increase because the overlapping area between each fixed electrode tooth of the other first fixed electrode 50 and each movable electrode tooth of corresponding movable electrode portion 36 becomes larger.

Provided that each detection capacitance CX11, CX21, CX12, CX22, CY11, CY21, CY12, CY22 is initially C0, the changes in the first detection capacitances CX11, CX21, CX12, CX22 are respectively ΔCx, and changes in the second detection capacitances CY11, CY21, CY12, CY22 are respectively ΔCy. In that case, the detection capacitances CX11, CX21, CX12, CX22, CY11, CY21, CY12, CY22 are described by the following equations:

$$CX11=C0-\Delta Cx, \ CX21=C0-\Delta Cx, \ CX12=C0+\Delta Cx,$$
$$CX22=C0+\Delta Cx, \ CY11=C0-\Delta Cy, \ CY21=C0+\Delta Cy,$$
$$CY12=C0+\Delta Cy, \ CY22=C0-\Delta Cy.$$

Substituting the above equations for the detection capacitances CX11, CX21, CX12, CX22, CY11, CY21, CY12, CY22 in eq. 4, the following equation, eq. 6, is obtained.

$$S = \{(CX21-CX11)+(CX12-CX22)+ \quad \text{(eq. 6)}$$
$$(CY21-CY11)+(CY12-CY22)\} \times Vcc/Cf =$$
$$\{(C0-\Delta Cx-C0+\Delta Cx)+(C0+\Delta Cx-C0-\Delta Cx)+$$
$$(C0+\Delta Cy-C0+\Delta Cy)+(C0+\Delta Cy-C0+\Delta Cy)\} \times$$
$$Vcc/Cf = 4 \times \Delta Cy \times Vcc/Cf$$

Therefore, the output S includes only the changes ΔCy of the second detection capacitances CY11, CY21, CY12, CY22, which are expected to contribute the acceleration detection along the second direction Y, because the changes ΔCx of the first detection capacitances CX11, CX21, CX12, CX22, which are noises in the output S, are canceled.

The movement of the movable electrode 30 along the second direction Y is detected on the basis of the sum of the differential output (CY21−CY11) of the first pair of the second detection capacitors CY21, CY11 and the differential output (CY12−CY22) of the second pair of the second detection capacitors CY12, CY22, while the changes in the first detection capacitances CX11, CX21, CX12, CX22 are canceled out by the sum of the differential output (CX21−CX11) of the first pair of the first detection capacitors CX21, CX11 and the differential output (CX12−CX22) of the second pair of the first detection capacitors CX12, CX22.

As a result, in the acceleration sensor S1 in FIGS. 1 and 2, the output S includes substantially only the changes in capacitances that are expected to contribute to the acceleration detection along the first direction X or the second direction Y, because the changes in other capacitances that otherwise becomes noises in the output S are cancelled.

Incidentally, when the movable electrode 30 rotates counterclockwise around the axis that is orthogonal to the first and second directions X, Y, the output S is substantially zero, as shown by eq. 7.

$$S = \{(CX21 - CX11) + (CX12 - CX22) + \\ (CY21 - CY11) + (CY12 - CY22)\} \times Vcc/Cf = \\ \{(C0 + \Delta Cx - C0 + \Delta Cx) + (C0 - \Delta Cx - C0 - \Delta Cx) + \\ (C0 + \Delta Cy - C0 + \Delta Cy) + \\ (C0 - \Delta Cy - C0 - \Delta Cy)\} \times Vcc/Cf = 0$$
(eq. 7)

The detection method for the output S is not limited to the switched capacitor circuit 200 in FIG. 3. As long as the output S is detected on the basis of the sum of the four differential outputs (CX21−CX11), (CX12−CX22), (CY21−CY11), (CY12−CY22) in response to the movement of the movable electrode 30 along the first direction X or the second direction Y using the configuration of the detection capacitances CX11, CX21, CX12, CX22, CY11, CY21, CY12, CY22 in the semiconductor acceleration sensor S1 in FIG. 1, other methods are can be used.

Second Embodiment

In the semiconductor acceleration sensor S1 in FIG. 1, Each of the fixed electrodes 40, 50, 60, 70 interleaves with each movable electrode portion 36 such that each fixed electrode tooth of the fixed electrodes 40, 50, 60, 70 faces each movable electrode tooth of the movable electrode portions 36 at the two ends along the first direction X and at the two ends along the second direction Y of the movable electrode 30, respectively. Each detection capacitance CX11, CX21, CX12, CX22, CY11, CY21, CY21, CY12, CY22 is mainly determined by the distance and the facing area between each fixed electrode tooth and each movable electrode tooth and by the numbers of the fixed and movable electrode teeth. Therefore, each detection capacitance CX11, CX21, CX12, CX22, CY11, CY21, CY21, CY12, CY22 can be optimized with the distance, the facing area, and the numbers.

Figure 5:
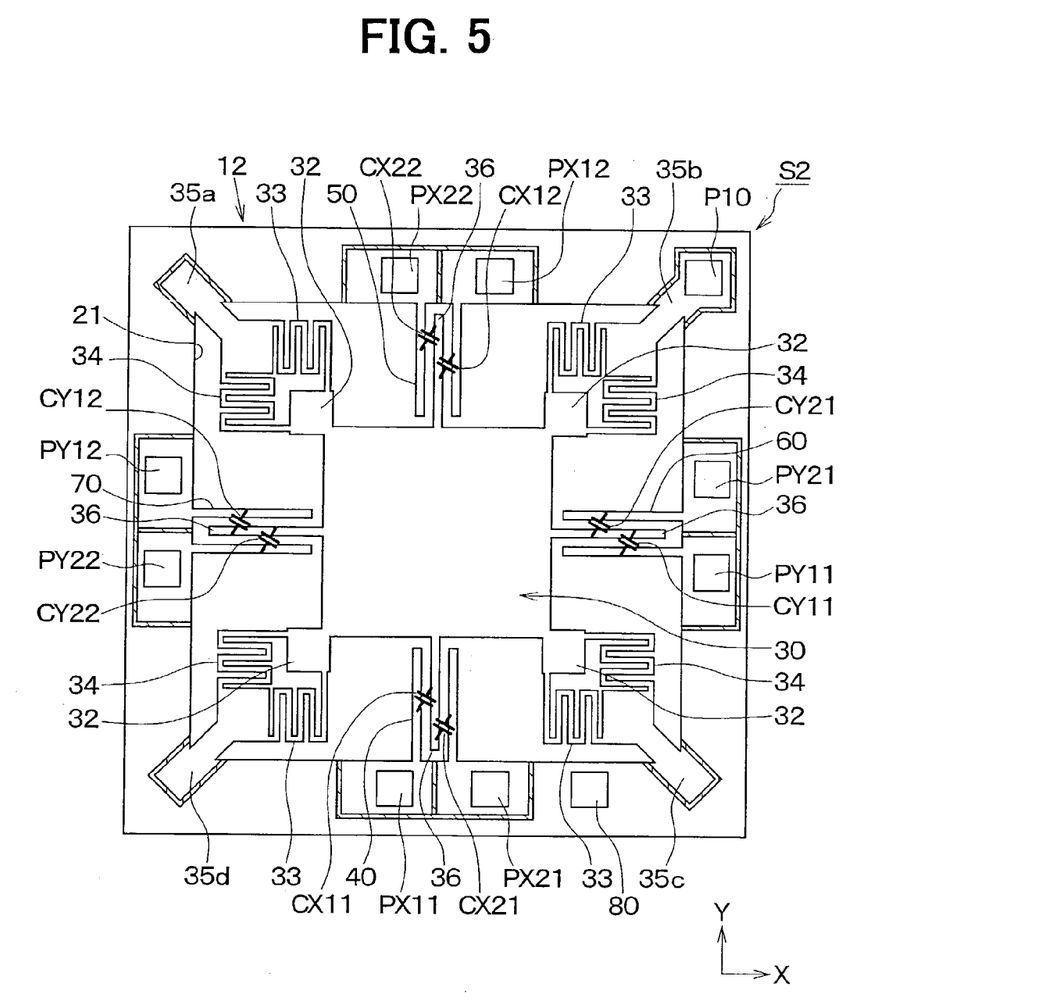
FIG. 5 is a plan view of a semiconductor acceleration sensor according to the second embodiment of the present invention.

As shown in FIG. 5, a semiconductor acceleration sensor S2 according to the second embodiment is different from the sensor S1 in FIG. 1 in the numbers of the fixed and movable electrode teeth. In the sensor S2, each fixed electrode 40, 50, 60, 70 has two fixed electrode teeth, and each movable electrode portion 36 of movable electrode 30 has one movable electrode tooth, as shown in FIG. 5. In other aspects, the sensor S2 in FIG. 5 is similar to the sensor S1 in FIG. 1.

As shown in FIG. 5, a first pair of first detection capacitance CX11, CX21 are formed with two fixed electrode teeth of one of the first fixed electrodes 40 and one movable electrode tooth of one of the movable electrode portions 36. A second pair of first detection capacitance CX12, CX22 are formed with two fixed electrode teeth of the other first fixed electrode 50 and one movable electrode tooth of another one of the movable electrode portions 36. A first pair of second detection capacitance CY11, CY21 are formed with two fixed electrode teeth of one of the second fixed electrodes 60 and one movable electrode tooth of another one of the movable electrode portions 36. A second pair of second detection capacitance CY12, CY22 are formed with two fixed electrode teeth of the other fixed electrode 70 and one movable electrode tooth of the rest of the movable electrode portions 36.

Therefore, when the movable electrode 30 moves in the sensor S2 of FIG. 5 along one of the two directions X, Y under acceleration, the detection capacitance formed on one side of each of movable electrode teeth, which extend along the direction orthogonal to the moving direction of the movable electrode 30, increases while the detection capacitance formed on the other side is decreases. Thus, the semiconductor acceleration sensor S2 in FIG. 5 provides substantially the same effect in the detection of acceleration as the semiconductor acceleration sensor S1 in FIG. 1.

Third Embodiment

Figure 6:
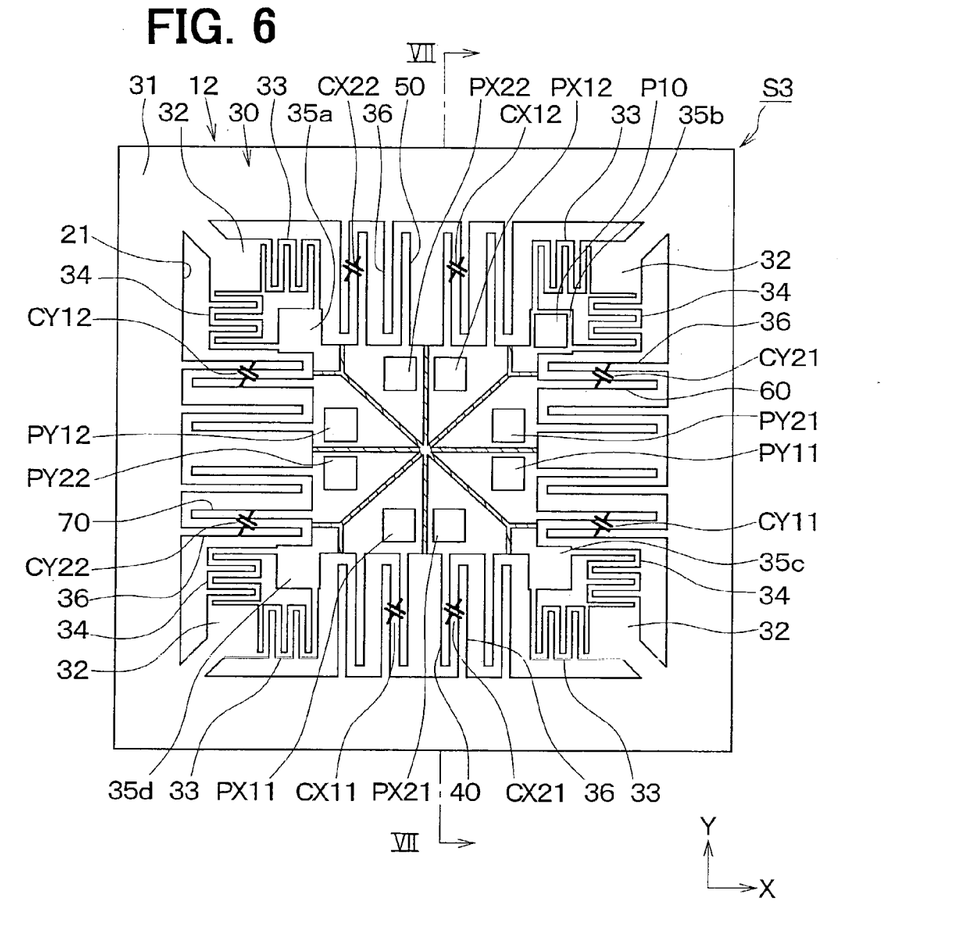
FIG. 6 is a plan view of a semiconductor acceleration sensor according to the third embodiment of the present invention.
Figure 7:
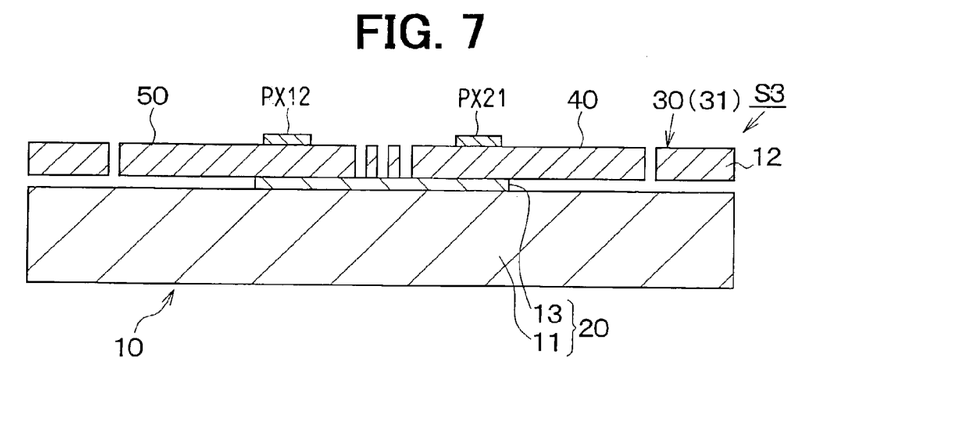
FIG. 7 is a cross-sectional view of the semiconductor acceleration sensor taken along the line VII—VII in FIG. 6.

As shown in FIGS. 6 and 7, a semiconductor acceleration sensor S3 is different from the semiconductor acceleration sensor S1 of FIG. S1 in configuration of fixed and movable electrodes. That is, in the sensor S1, the first fixed electrodes 40, 50 and the second fixed electrodes 60, 70 are located at the periphery of the second silicon substrate 12 to surround the movable electrode 30. On the other hand, in the sensor S3, a movable electrode 30 is located at the periphery of the second silicon substrate 12 to surround first fixed electrodes 40 50 and second fixed electrodes 60, 70.

Specifically, as shown in FIGS. 6 and 7, the central part of the second silicon substrate 12 is fixed and supported by a supporting substrate 20, which includes a first silicon substrate 11 and an oxide film 13. The oxide film 13 is located under the central part of the second silicon substrate 12, so the periphery of the second silicon substrate 12 can move in the sensor S3 as the movable electrode 30.

As shown in FIG. 6, in the sensor S3, anchor parts 35a, 35b, 35c, 35d are comparable to the second weight parts 32 in FIG. 1, and the rectangular-frame-shaped periphery of the second silicon substrate 12 makes up first weight part 31 of movable electrode 30. Second weight parts 32 jut inward toward the anchor parts 35a, 35b,35c, 35d from the four corners of the first weight part 31.

As shown in FIG. 6, each fixed electrodes 40, 50, 60, 70 is shaped like a comb with teeth and includes four fixed electrode teeth. The fixed electrode teeth jut outward from the central part, which is fixed to the supporting substrate 20. A movable electrode portion 36, which is shaped like a comb with teeth and includes four movable electrode teeth, is located at each inward end of the rectangular-frame-shaped first weight part 31 of the movable electrode 30. The movable electrode teeth jut from each inward end.

In the sensor S3 of FIG. 6, each fixed electrode tooth of the first fixed electrodes 40, 50 faces each movable electrode tooth of two of the movable electrode portions 36, which juts from the inward ends along the second direction Y. Each fixed electrode tooth of the second fixed electrodes 60, 70 faces each movable electrode tooth of the other two of the movable electrode portions 36, which juts from the inward ends along the first direction X.

In the sensor S3 of FIG. 6, one capacitance increases while the other capacitance decreases in the first pair of the first detection capacitances CX11, CX21, the second pair of the first detection capacitances CX12, CX22, the first pair of the second detection capacitances CY11, CY21, and the second pair of the second detection capacitances CY12 and CY22 in response to the movement of the movable electrode 30 under an acceleration in the target direction. That is, the relationships between the detection capacitances CX11, CX21, CX12, CX22, CY11, CY21, CY12 CY22 in the sensor S3 of FIG. 6 are similar to those in the sensor S1 of FIG. 1.

As shown in FIG. 6, the movable electrode 30 and the fixed electrodes 40, 50, 60, 70 are electrically connected to corresponding pads P10, PX11, PX21, PX12, PX22, PY11, PY21, PY12, PY22, respectively. The pads P10, PX11, PX21, PX12, PX22, PY11, PY21, PY12, PY22 are located on the central part, which is fixed to the supporting substrate 20 and electrically isolated from each other.

The semiconductor acceleration sensor S3 in FIGS. 6 and 7 provides substantially the same effect in the detection of acceleration as the semiconductor acceleration sensor S1 in FIG. 1. That is, the output of the sensor S3 includes substantially only the changes in capacitances that are expected to contribute the acceleration detection along the first direction X or the second direction Y because the changes in other capacitances that otherwise becomes noises in the output are cancelled.

In the sensor S3, the movable electrode 30 is located at the periphery of the second silicon substrate 12 to surround the fixed electrodes 40, 50, 60, 70, so the size and the weight of the movable electrode 30 can be made much larger than that in the sensor S1 of FIG. 1. Therefore, the sensor S3 can readily provide higher sensitivity than the sensor S1 of FIG. 1 because the sensitivity of the sensor S3 increases in proportion to the weight of the movable electrode 30.

Other Embodiments

The movable electrode 30 and the fixed electrodes 40, 50, 60, 70 interleave each other and partially face each other in the sensor S1 of FIG. 1, the sensor S2 of FIG. 5, and the sensor S3 of FIG. 6. However, movable electrode and fixed electrodes do not have to interleave.

What is claimed is:

1. A semiconductor sensor for detecting a dynamic quantity related to a force applied to the sensor, the sensor comprising:
   a movable electrode displaceable within a semiconductor substrate along a first direction and a second direction, which are substantially orthogonal to each other on a plane parallel to the semiconductor substrate, in response to an applied force;
   a first fixed electrode that is stationary in the semiconductor substrate, wherein the first fixed electrode faces the movable electrode along the second direction, wherein the first fixed electrode includes a pair of teeth for forming a first pair of first detection capacitances with the movable electrode;
   a second fixed electrode facing the movable electrode along the first direction, wherein the second fixed electrode includes a pair of teeth for forming a first pair of second detection capacitances with the movable electrode;
   a carrier wave application device for applying a carrier wave to the first fixed electrode and the second fixed electrode; and
   a signal processing circuit connected to the movable electrode,
   wherein one of the first pair of first detection capacitances increases while the other decreases when the movable electrode is displaced in the first direction,
   wherein the first pair of first detection capacitances increase or decrease together when the movable electrode is displaced in the second direction,
   wherein one of the first pair of second detection capacitances increases while the other decreases when the movable electrode is displaced in the second direction,
   wherein the first pair of second detection capacitances increase or decrease together when the movable electrode is displaced in the first direction,
   wherein the dynamic quantity is measured based upon a differential output of the first pair of first detection capacitances and a differential output of the first pair of second detection capacitances, when the movable electrode is displaced in the first direction or the second direction under the force applied to the sensor, and
   wherein the signal processing circuit receives the differential output of the first pair of first detection capacitances and the differential output of the first pair of second detection capacitances after the carrier wave is applied to the fixed electrode by the carrier wave circuit only through the movable electrode.

2. The sensor in claim 1, wherein:
   the first fixed electrode and the second fixed electrode are disposed around the movable electrode in the semiconductor substrate; and
   the first fixed electrode and the second fixed electrode face outward ends of the movable electrode along the second direction and the first direction, respectively.

3. The sensor in claim 1, wherein:
   the first fixed electrode and the second fixed electrode are disposed around the movable electrode in the semiconductor substrate; and
   the first fixed electrode and the second fixed electrode face inward ends of the movable electrode along the second direction and the first direction, respectively.

4. The sensor in claim 1, wherein the movable electrode includes a plurality of movable electrode portions, wherein each movable electrode portion is shaped like a comb with teeth and includes a pair of movable electrode teeth, wherein each of the pair of teeth of the first and second fixed electrodes interleaves with a respective movable electrode portion to form the first and second detection capacitances.

5. The sensor in claim 1, further comprising:
   a third fixed electrode that is stationary in the semiconductor substrate, wherein the third fixed electrode faces the movable electrode along the second direction, wherein the third fixed electrode includes a pair of teeth for forming a second pair of first detection capacitances with the movable electrode;
   a fourth fixed electrode facing the movable electrode along the first direction, wherein the fourth fixed electrode includes a pair of teeth for forming a second pair of second detection capacitances with the movable electrode,
   wherein one of the second pair of first detection capacitances increases while the other decreases when the movable electrode is displaced in the first direction, wherein the second pair of first detection capacitances increase or decrease together when the movable electrode moves along the second direction, wherein one of the second pair of second detection capacitances increases while the other decreases when the movable electrode is displaced in the second direction, wherein the second pair of second detection capacitances increase or decrease together when the movable electrode is displaced in the first direction, wherein the dynamic quantity related to a force applied to the sensor is measured based upon a summation of the differential output of the first pair of first detection capacitances, a differential output of the second pair of first detection capacitances, the differential output of the first pair of second detection capacitances and a differential output of the second pair of second detection capacitances, when the movable electrode is displaced in the first direction or the second direction under the force applied to the sensor.

6. The sensor in claim 5, wherein:
the first, second, third and fourth fixed electrodes are disposed around the movable electrode in the semiconductor substrate;
the first and third fixed electrodes face outward ends of the movable electrode along the second direction; and
the second and fourth fixed electrodes face outward ends of the movable electrode along the first direction.

7. The sensor in claim 5, wherein:
the first, second, third and fourth fixed electrodes are disposed around the movable electrode in the semiconductor substrate;
the first and third fixed electrodes face inward ends of the movable electrode along the second direction; and
the second and fourth fixed electrodes face inward ends of the movable electrode along the first direction.

8. The sensor in claim 5, wherein the movable electrode includes a plurality of movable electrode portions, wherein each movable electrode portion is shaped like a comb with teeth and includes a pair of movable electrode teeth, wherein each of the pair of teeth of the first and third fixed electrodes interleaves with a respective movable electrode portion to form the first and second pair of first detection capacitances, wherein each of the pair of teeth of the second and fourth fixed electrodes interleaves with a respective movable electrode portion to form the first and second pair of second detection capacitances.

9. A semiconductor sensor for detecting a dynamic quantity related to a force applied to the sensor, the sensor comprising:
a movable electrode displaceable within a semiconductor substrate along a first direction and a second direction, which are substantially orthogonal to each other on a plane parallel to the semiconductor substrate, in response to an applied force;
a first fixed electrode that is stationary in the semiconductor substrate, wherein the first fixed electrode faces the movable electrode along the second direction, wherein the first fixed electrode includes a first pair of teeth for forming a first pair of first detection capacitances with the movable electrode, and a second pair of teeth for forming a second pair of first detection capacitances with the movable electrode;

a second fixed electrode facing the movable electrode along the first direction, wherein the second fixed electrode includes a first pair of teeth for forming a first pair of second detection capacitances with the movable electrode, and a second pair of teeth for forming a second pair of second detection capacitances with the movable electrode;

a carrier wave circuit for applying a carrier wave to the first fixed electrode and the second fixed electrode; and a signal processing circuit connected to the movable electrode, wherein one of the first pair of first detection capacitances increases while the other decreases when the movable electrode is displaced in the first direction, wherein the first pair of first detection capacitances increase or decrease together when the movable electrode is displaced in the second direction, wherein one of the second pair of first detection capacitances increases while the other decreases when the movable electrode is displaced in the first direction, wherein the second pair of first detection capacitances increase or decrease together when the movable electrode moves along the second direction, wherein one of the first pair of second detection capacitances increases while the other decreases when the movable electrode is displaced in the second direction, wherein the first pair of second detection capacitances increase or decrease together when the movable electrode is displaced in the first direction, wherein one of the second pair of second detection capacitances increases while the other decreases when the movable electrode is displaced in the second direction, wherein the second pair of second detection capacitances increase or decrease together when the movable electrode moves along the first direction, wherein the dynamic quantity is measured based upon a differential output of the first pair of first detection capacitances, a differential output of the second pair of first detection capacitances, a differential output of the first pair of second detection capacitances, and a differential output of the second pair of second detection capacitances when the movable electrode is displaced in the first direction or the second direction under the force applied to the sensor, wherein the signal processing circuit receives the differential output of the first pair of first detection capacitances and the differential output of the first pair of second detection capacitances after the carrier wave is applied to the first and second fixed electrodes by the carrier wave circuit only through the movable electrode.

* * * * *